United States Patent [19]

Snell et al.

[11] 4,241,454
[45] Dec. 23, 1980

[54] HARD LIMITING ACQUISITION TECHNIQUE FOR PSK CARRIER DETECTOR

[75] Inventors: James L. Snell, Palm Bay; Raymond F. Cobb, Melbourne Beach, both of Fla.

[73] Assignee: Harris Corporation, Cleveland, Ohio

[21] Appl. No.: 882,068

[22] Filed: Feb. 28, 1978

[51] Int. Cl.³ .......................... H04B 1/16; H03D 3/18
[52] U.S. Cl. ..................................... 455/260; 329/50; 375/88
[58] Field of Search .................. 325/419, 347, 320; 329/122, 50; 455/260, 210; 375/88

[56] References Cited

U.S. PATENT DOCUMENTS

| | | | |
|---|---|---|---|
| 3,909,735 | 9/1975 | Anderson et al. | 329/122 |
| 4,000,476 | 12/1976 | Walker et al. | 329/122 |
| 4,071,829 | 1/1978 | Davis et al. | 329/122 |
| 4,079,329 | 3/1978 | England et al. | 329/122 |

Primary Examiner—Stephen C. Buczinski
Attorney, Agent, or Firm—Craig & Antonelli

[57] ABSTRACT

A carrier recovery scheme for a PSK demodulator through which side locking onto an interference-created sideband is avoided includes a hard-limited upstream of a phase-locked loop which removes jammer-induced AM from the input signal. As the loop sweeps through the frequency range of interest, a lock detector, coupled to the phase-locked loop will lock onto or acquire only the true carrier and thereby enable demodulation of the PSK information signal.

In a digital implementation of the invention, received PSK input signals are converted into digital format by a multi-level quantizer, after being down-converted to an IF signal and subjected to gain control. The output of the quantizer may be a multi-bit, parallel word indicative of the changing amplitude of the IF signal which is to be sampled at the receiver sampling rate and converted into a digitally encoded representation of a received IF signal sample. Successive digitally encoded samples are coupled through matched in-phase (I) and quadrature (Q) channel filters and applied to a phase-locked loop. The phase-locked loop is, in turn, coupled to a lock detector which controls the operation of the hard-limiter. The phase-locked loop is also coupled to the quantizer to control the rate at which quantized input signals are sampled.

Prior to acquiring the carrier, the output of the lock detector is such that the quantizer effectively hard-limits the PSK input to one of two levels, so that it is essentially polarity sensitive, rather than both polarity and magnitude sensitive. Once the carrier has been acquired, the lock detector removes the hard-limiting action of the quantizer and causes the quantizer to operate in its normal multi-level mode. Although removal of the hard-limiting action of the quantizer permits AM sidebands to return, the loop has already locked onto the true carrier, so that the sidebands will not be swept to cause false locking.

16 Claims, 4 Drawing Figures

HARD LIMITING ACQUISITION TECHNIQUE FOR PSK CARRIER DETECTOR

The United States Government has rights in this invention pursuant to Contract No. DAAB 07-75-C-0040 awarded by the Department of the Army.

FIELD OF THE INVENTION

The present invention relates to communication systems and is particularly directed to a technique of acquiring or locking on to a carrier in a phase shift keyed (PSK) modulation receiver.

BACKGROUND OF THE INVENTION

A common scheme for recreating a carrier for demodulating a received PSK signal is the provision of a phase-locked loop through which a carrier frequency is acquired and held, whereby synchronous detection of the received PSK signals can be carried out. In order to acquire the carrier frequency, it is quite often necessary to sweep the carrier recovery loop across a range of frequency uncertainty until lock is achieved; usually this frequency sweep proceeds automatically with a lock detector terminating the sweep upon sensing a lock condition. The U.S. Pat. to Walker et al No. 4,000,476, and Anderson et al No. 3,090,735, may be referred to for a description of exemplary signal recovery systems wherein such phase-locked loop circuitry is employed. In the above-identified Walker et al patent, the problem of side-locking is described, with the inventive system disclosed therein employing a lock inhibiter circuit which is used to drive the loop oscillator away from a side band frequency erroneously acquired by the loop. However, Walker appears to address the case of side locking to data related side bands and would not be totally effective against jammer-induced AM which is not data related; unless band pass filter 20 in Walker FIG. 3 happened to be tuned to exactly the pulse rate of the jammer, side lock would not be detected.

Unfortunately, side locking is one form of jamming to which a PSK demodulator is vulnerable, even when the transmitted PSK signal has been spread out by mixing the original information-containing signal with a pseudo random noise sequence prior to transmission, to thereby widen or spread out the spectrum of the transmitted signal energy. Because of the energy spread, the signal-to-noise ratio is substantially reduced, so that the input portion of the receiver correlation circuitry which collapses the spread spectrum signal into its original waveform bandwidth normally includes automatic gain control circuitry which establishes the necessary signal levels so as to maximize the received signal processing operation. If a strong interference signal, such as a pulsating jamming signal, is received along with the transmitted PSK signal, the influence of the jamming signal on the operation of the AGC circuitry may be such that it causes the AGC circuit to effectively amplitude-modulate the desired input signal. This amplitude modulation (AM), in turn, produces sidebands in the spectrum of the received signal, spaced at multiples of the jamming pulse rate. As a result, when the phase-locked loop, in its search for the carrier, sweeps across one of these sidebands, the lock detector, which cannot distinguish between a jammer-induced AM sideband and the true carrier, locks onto the sideband and terminates the frequency sweep, preventing the receiver from demodulating the information-containing signal.

SUMMARY OF THE INVENTION

In accordance with the present invention, applicants have developed a carrier recovery scheme for a PSK demodulator through which side locking onto an interference-created sideband is avoided, thereby increasing the speed with which carrier recovery can be achieved. To this end, during the carrier recovery or acquisition process, the signal input to the PSK demodulator is hard-limited upstream of the phase-locked loop, thereby removing the jammer-induced AM from the input signal, so that unwanted sidebands are not present in the signal input to the loop. As a result, as the loop sweeps through the frequency range of interest, the lock detector will lock onto or acquire only the true carrier and thereby enable demodulation of the PSK information signal. By avoiding side lock, through use of a hard-limiter, the present invention does not suffer from shortcomings attendant in a system such as described in the above-cited Walker et al patent, wherein side lock is permitted to occur, with loop correction circuitry responding to this condition and driving the phase-locked loop oscillator out of lock for further search for a true carrier.

In a preferred embodiment of the invention, a digital implementation is provided with received PSK input signals converted into digital format by a multilevel quantizer, after being received and down-converted to an IF signal and subjected to gain control. The output of the quantizer may be a multi bit, parallel word indicative of the changing amplitude of the IF signal which is to be sampled at the receiver sampling rate and converted into a digitally encoded representation of a received IF signal sample. The successive digitally encoded samples are then coupled through matched in-phase (I) and quadrature (Q) channel filters and applied to a phase-locked loop. The phase-locked loop is, in turn, coupled to a lock detector which controls the operation of the hard-limiter. The phase-locked loop is also coupled to the quantizer to control the rate at which quantized input signals are sampled.

Prior to acquiring the carrier, the output of the lock detector is such that the quantizer effectively hard-limits the PSK input to one of two levels, so that it is essentially polarity sensitive, rather than both polarity and magnitude sensitive. While this hard-limiting action of the quantizer may result in degradation of the bit error rate performance of the demodulator, it does eliminate the jammer-induced AM and permits the lock detector to accurately acquire the true carrier. Once the carrier has been acquired, the lock detector removes the hard-limiting action of the quantizer and causes the quantizer to operate in its normal multilevel mode. Although removal of the hard-limiting action of the quantizer permits AM sidebands to return, the loop has already locked onto the true carrier, so that the sidebands will not be swept to cause false locking.

DETAILED DESCRIPTION

Figure 1:
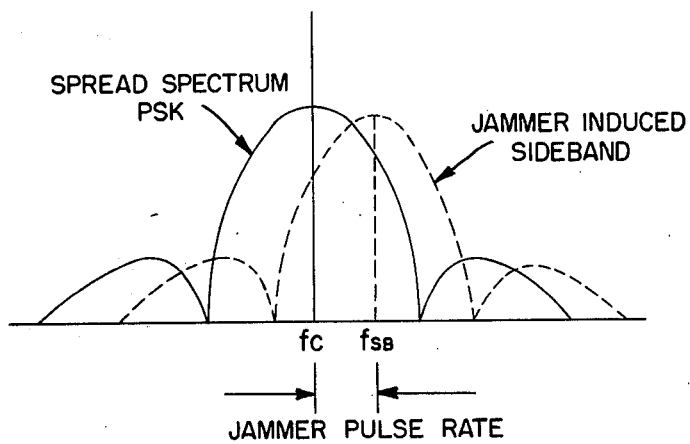
FIG. 1 is a diagram of the spectrum characteristics of a spread spectrum PSK signal and an amplitude modulation induced sideband of the PSK signal.

FIG. 1 illustrates the effect of jammer-induced amplitude modulation on a spread spectrum PSK signal. The solid line in FIG. 1 represents the spectrum characteristic of a spread spectrum PSK signal having a carrier frequency $f_c$. If the amplitude of such a PSK signal is amplitude-modulated, as by pulsing the input to an automatic gain control circuit disposed in the input signal channel through which the gain IF spread spectrum input signal is adjusted prior to correlation, the channel will further contain an AM sideband, shown in broken lines in FIG. 1, centered at a sideband frequency $f_{SB}$, shifted from the carrier frequency $f_c$ by the jammer pulse rate. In accordance with the present invention, during acquisition of the carrier frequency $f_c$, the input to the PSK demodulator is effectively hard-limited, to thereby remove the jammer-induced sideband as a component of the signal channel. Upon carrier acquisition, removal of the hard-limiter causes the jammer-induced sideband to reappear in the signal channel along with the spread spectrum PSK IF signal. However, with the phase-locked loop locked onto the frequency $f_c$, any jammer-induced sideband will not prevent continued acquisition of a coherent demodulation reference, so that, at most, the jammer-induced sideband will contribute only minor fluctuations in the PSK amplitude inputs to the quantizer.

Figure 2:
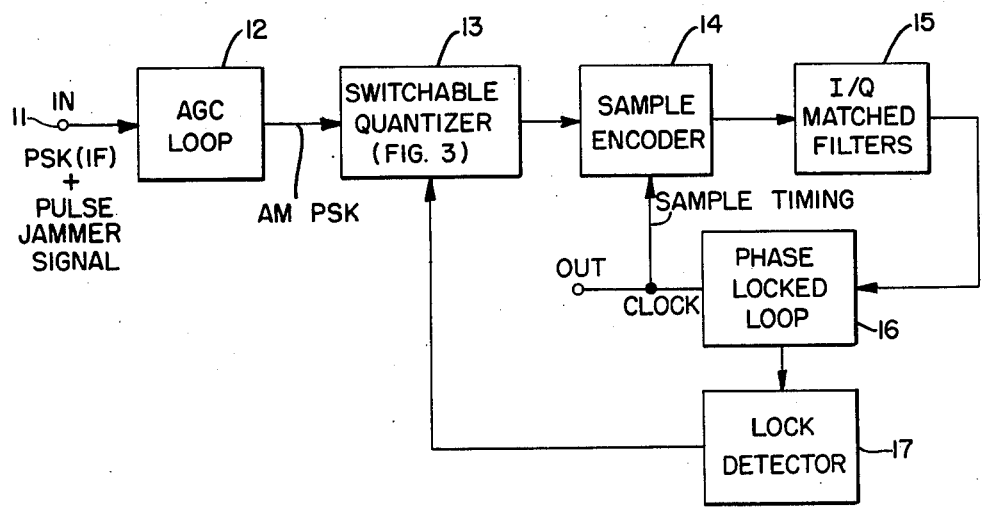
FIG. 2 is a schematic block diagram of a synchronous detection frequency recover system having a controlled quantizer.

FIG. 2 illustrates a schematic diagram of a controlled hard-limiting carrier acquisition system, having an input terminal 11 to which a received down-converted PSK signal is applied. Assuming that the received PSK signal of interest is accompanied by interference, such as that produced by a pulsating jammer, there will be applied to an AGC loop 12 the (IF) PSK spread spectrum signal together with a noise or interference signal pulsed on and off at some jamming repetition rate. The pulsing jammer signal will cause the AGC loop 12 to vary the gain of the signal channel at this jamming repetition rate, so as to effectively amplitude-modulate the PSK signal of interest. The AM PSK signal is applied to a switchable quantizer 13 wherein the amplitude of the PSK signal is quantized in accordance with a prescribed set of spaced amplitude levels into a digital word. Discrete samples of the digitized PSK amplitude are encoded by sample encoder 14 in accordance with the recovered carrier clock rate obtained from phase-locked loop 16 and applied to separate in-phase (I) and quadrature (Q) channel matched filters 15 for appropriate filtering. For the preferred digital scheme described herein, filters 15 may be appropriate digital filters. These filters supply I and Q encoded PSK amplitude samples to phase-locked loop 16.

Phase-locked loop 16 may contain the standard phase detector, lowpass filter, voltage-controlled clock arrangement well known to those skilled in the art, so that no detailed description need be presented here. For reference purposes, attention may be directed to the previously cited patents, it being noted that the configuration shown in FIG. 2 contains a digital implementation of the various loop and detector components. The clock output of phase-locked loop 16 represents the recovered carrier frequency which is coupled to sample-encoder 14 so as to control the quantized PSK sampling rate. The output of the phase detector of phase-locked loop 16 is also coupled to a lock detector, which may be comprised of an appropriate lowpass filter, threshold comparator, gate arrangement for monitoring the d.c. level component of the output of the phase-locked loop's phase detector and which generates an output signal upon this d.c. component exceeding a set threshold indicating acquisition of a relatively strong frequency component in the scanned or swept frequency range of interest. This output is coupled to quantizer 13 to remove the hard-limiting action of quantizer 13 upon acquisition of the carrier $f_c$.

Figure 3:
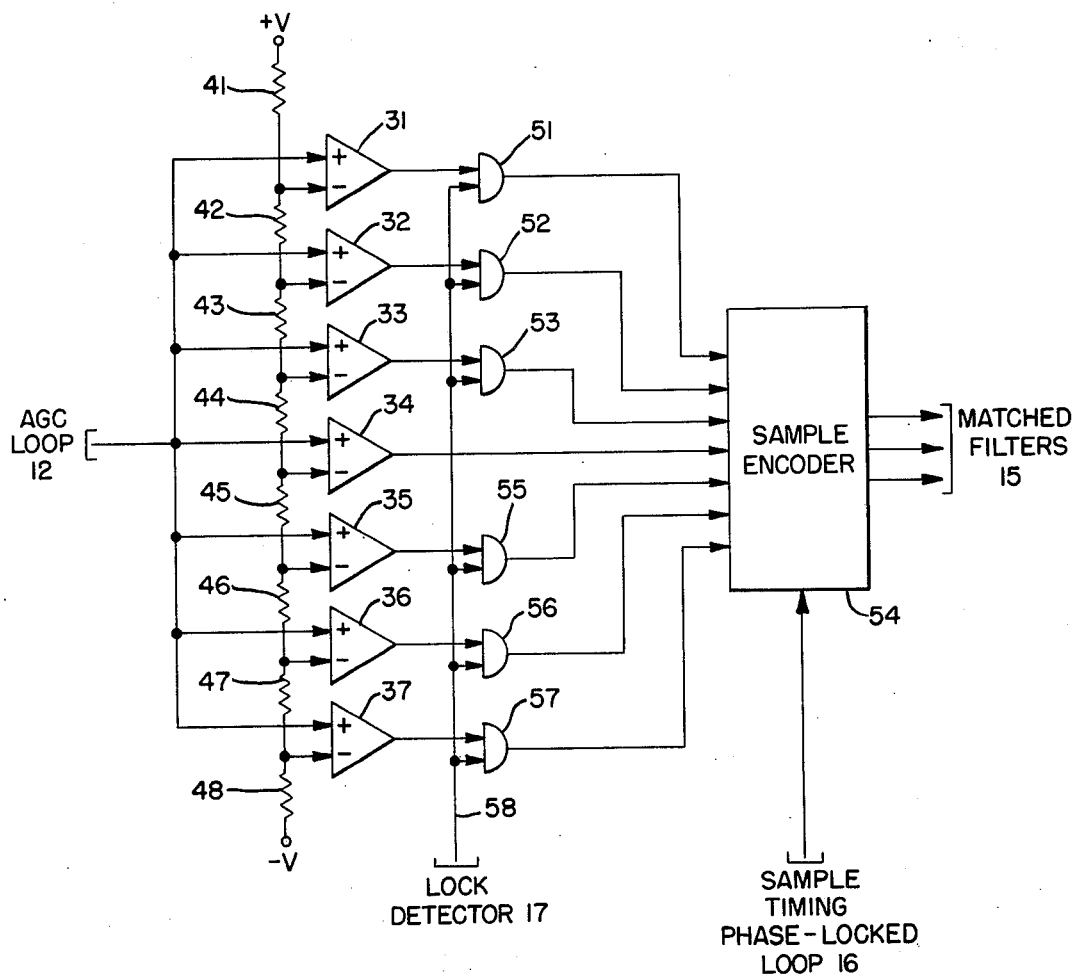
FIG. 3 is a schematic diagram of the switchable quantizer contained in the system shown in FIG. 2.

Switchable quantizer 13 and its connection to encoder 14 are illustrated in detail in FIG. 3. The quantizer 13 may comprise a seven bit quantizer comprised of a set of seven threshold comparators 31 through 37 which compare the signal output of AGC loop 12 with respect to seven successively larger threshold voltages established by a voltage divider comprised of resistors 41 through 48 connected between positive voltage terminal (+V) and negative voltage terminal (−V). The outputs of comparators 31 through 33 may be coupled to one input of respective AND gates 51 through 53, while the output of threshold comparators 35 through 37 may be coupled to one input of respective AND gates 55 through 57. The output of comparator 34 and the outputs of AND gates 51, 53, and 55 through 57 are coupled over seven respective input lines to sample-encoder circuit 43. Encoder 54 may convert the seven bit input word in quantizer output lines Q1 through Q7 into a three-bit binary output word representative of the amplitude of the PSK signal from AGC loop 12 at the time of sampling of the quantizer output dictated by the output of the phase-locked loop clock. This three-bit binary word is then coupled via the I and Q matched filters to the phase-locked loop.

During the carrier acquisition mode, the output of the lock detector on line 58 may disable each of AND gates 51 through 53 and 55 through 57 so that quantizer 13 effectively consists only of threshold comparator 34 and thereby hard-limits the output of the AGC loop 12. Threshold comparator 34 is centrally located along the voltage divider and effectively measures the output of the AGC loop 12 relative to a ground or zero potential reference point, so that its output represents the polarity of the quantized signal. The number of resistors and associated threshold comparators distributed along the voltage divider network determine the various levels into which an input signal is quantized. Depending upon the range over which the AGC loop may vary the amplitude of the signal channel in response to a jamming input, the voltage level to which the hard-limiting action may extend may be adjusted by selectively inhibiting or gating the outputs of the appropriate threshold comparators. In the example shown in FIG. 3, it is assumed that a minimum weighing factor corresponding to the middle or centrally located threshold comparator appropriately limits amplitude variations in the PSK signal. Therefore, with GATES 51 through 53 and 55 through 57 disabled, the outputs Q1 through Q7 of quantizer 12 will simply indicate the polarity of the PSK signal, so that the output of encoder 54 will be effectively indicative of the zero crossings or carrier frequency $f_c$ of the PSK signal. When the carrier frequency has been acquired, the output of lock detector 17 on line 58 will be switched to remove the disabling level at respective inputs of AND gates 51 through 53 and 55 through 58, so that the output of the quantizer and, consequently, encoder 54 will represent both the polarity and magnitude of the PSK signal, to be subsequently decoded for deriving the original information signal.

In a preferred embodiment of the invention, described above, the implementation chosen is digital, with the hard-limiting action of the system effectively being achieved by selective control of the operation of a quantizer by way of which the PSK signal is converted into digital format. A detailed description of a digital configuration of the filtering, phase-locked loop, and lock detector scheme has not been presented since such components, per se, are not the subject matter of the present invention and may take on various digital adaptations to meet design and operation requirements of a particular system. Still, for reference purposes, attention may be directed to copending U.S. Patent application of Jon D. England and James L. Snell, Ser. No. 740,787, entitled "Signal Demodulator Including Data Normalization", filed Nov. 11, 1976, and assigned to the assignee of the present application, for a disclosure of an exemplary digital configuration for various PSK carrier recovery components including matched filters, phase locked-loop, and lock detector which may be employed in a digital configuration of the carrier recovery technique in accordance with the present invention.

Figure 4:
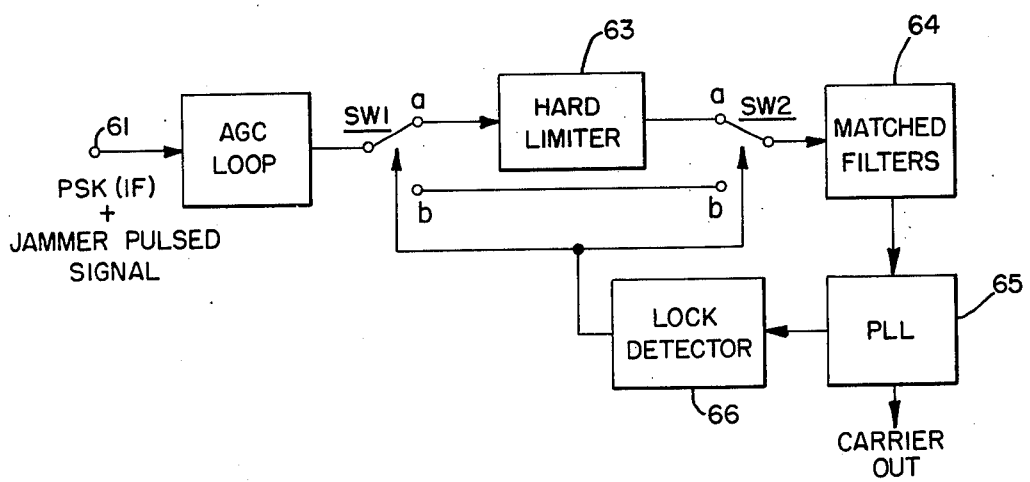
FIG. 4 is a schematic block diagram of a synchronous detection frequency recovery system having a switchable hard-limiter.

Although a preferred embodiment of the invention has been described above as being digitally configured, the carrier recovery scheme is not limited to only a digital implementation. The hard-limiting scheme of the present invention is equally applicable to an analog environment, and attention may be directed to FIG. 4 for an exemplary illustration of the same.

An (IF) input PSK signal and any accompanying jammer input are applied via input terminal 61 to AGC loop 62 which controls the gain of the signal channel to the necessary level for signal processing including subsequent correlation and demodulation, just as in the digital implementation shown in FIG. 2 described above. The output of AGC loop 62 may be coupled through switch SW$_1$ to hard-limiter 63. The output of hard-limiter 63 may be coupled via switch SW$_2$ to matched filter 64. The filtered I and Q components are then supplied to a conventional phase-locked loop 65 from the VCO from which the carrier may be derived. Phase-locked loop 65 is also coupled to a suitable lock detector 66. Again, reference may be had to the above-cited U.S. Patents to Anderson et al and Walker et al for a detailed description of exemplary analog configurations for phase-locked loop, lock detector arrangements which the components shown in FIG. 4 may take.

The output of lock detector 66 is coupled to a control input of switches SW$_1$ and SW$_2$, which control the insertion and removal of hard-limiter 63 with respect to the PSK signal channel. In the absence of a "carrier acquisition" output from lock detector 66, switches SW$_1$ and SW$_2$ are in the position "a" shown, so that the PSK signal is converted into a square wave having a repetition rate equal to the fundamental frequency of the PSK input, i.e. the carrier signal $f_c$. When the carrier frequency $f_c$ has been acquired, lock detector 66 causes each of switches SW$_1$ and SW$_2$ to switch from position a to position b, bypassing hard-limiter 63 and coupling the PSK signal via matched filters 64 directly to the phase detector of the phase-locked loop and decoding circuitry unattenuated for precise demodulation.

As will be appreciated from the foregoing description of the invention, erroneous acquisition of a noise or jammer-induced sideband in a PSK carrier recovery scheme is avoided by hard-limiting the received PSK signal prior to frequency tracking in a phase-locked loop. Since jamming signals which induce amplitude modulation of the PSK signal do not affect the polarity of the PSK signals, the hard-limiting technique permits accurate tracking of the zero-crossings and thereby recovery of the true carrier frequency. Once the system has locked onto the carrier, the hard-limiting action may be removed without fear of side-locking, so that the reduced demodulation performance resulting from the clipping action of the hard-limiter is obviated.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In a frequency recovery system wherein an incoming signal, which contains a prescribed frequency to be recovered and may be subjected to a modulation so as to contain a sideband, the center frequency of which is separated from said prescribed frequency, is processed to obtain said prescribed frequency, said frequency recovery system including a synchronous detector for deriving said prescribed frequency, the improvement wherein said frequency recovery system includes means for preventing said system from acquiring said sideband center frequency as said prescribed frequency, said preventing means including means for controlling the amplitude of said incoming signal prior to being processed, to thereby prevent said synchronous detector from detecting said sideband center frequency, said amplitude controlling means including means for controlling the amplitude of said incoming signal until said synchronous detector has recovered said prescribed frequency and thereafter removing the control of the amplitude of said incoming signal.

2. The improvement according to claim 1, wherein said preventing means comprises means for converting said incoming signal into a signal the absolute value of the amplitude of which is limited to a preselected value.

3. The improvement according to claim 2, wherein said converting means comprises means for selectively quantizing the amplitude of said incoming signal in accordance with a first preselected number of quantization levels until said synchronous detector has recovered said prescribed frequency and thereafter selectively quantizing the amplitude of said incoming signal in accordance with a second preselected number of quantization levels.

4. The improvement according to claim 3, wherein said second preselected number is larger than said first preselected number.

5. The improvement according to claim 1, wherein said amplitude control means comprises means for symmetrically clipping the amplitude of said incoming signal relative to a prescribed reference value.

6. The improvement according to claim 5, wherein said synchronous detector comprises a phase-locked loop and wherein said preventing means comprises a lock detector, coupled to said phase-locked loop, for causing said clipping means to symmetrically clip the amplitude of said incoming signal until said phase-locked loop has acquired said prescribed frequency and thereafter preventing said clipping means from symmetrically clipping the amplitude of said incoming signal.

7. The improvement according to claim 5, wherein said amplitude control means comprises means for selectively quantizing the amplitude of said incoming signal in accordance with a first preselected number of quantization levels until said synchronous detector has recovered said prescribed frequency and thereafter selectively quantizing the amplitude of said incoming signal in accordance with a second preselected number of quantization levels.

8. The improvement according to claim 7, wherein said second preselected number is larger than said first preselected number.

9. In a frequency recovery process wherein an incoming signal, which contains a prescribed frequency to be recovered and may be subjected to modulation so as to contain a sideband, the center frequency of which is separated from said prescribed frequency, is processed to obtain said prescribed frequency, said process including the step of synchronously detecting said prescribed frequency, the improvement wherein said process further includes the step of preventing the acquisition of said sideband center frequency as said prescribed frequency by controlling the amplitude of said incoming signal prior to being processed and thereby preventing synchronous detection of said sideband center frequency, said amplitude controlling step including the steps of controlling the amplitude of said incoming signal until said prescribed frequency has been synchronously detected, and thereafter terminating control of the amplitude of said incoming signal.

10. The improvement according to claim 9, wherein said preventing step comprises the step of converting said incoming signal into a signal the absolute value of the amplitude of which is limited to a preselected value.

11. The improvement according to claim 10, wherein said converting step comprises the steps of selectively quantizing the amplitude of said incoming signal in accordance with a first preselected number of quantization levels until said prescribed frequency has been synchronously detected, and thereafter selectively quantizing the amplitude of said incoming signal in accordance with a second preselected number of quantization levels.

12. The improvement according to claim 11, wherein said second preselected number is larger than said first preselected number.

13. The improvement according to claim 9, wherein said amplitude controlling step comprises the step of symmetrically clipping the amplitude of said incoming signal relative to a prescribed reference value.

14. The improvement according to claim 13, wherein said synchronous detection step comprises the steps of applying said incoming signal to a phase-locked loop and wherein said preventing step comprises the step of locking onto the frequency synchronously said phase-locked loop, and causing the symmetrical clipping of the amplitude of said incoming signal until said phase-locked loop has acquired said prescribed frequency and thereafter preventing said symmetrical clipping of the amplitude of said incoming signal.

15. The improvement according to claim 13, wherein said amplitude controlling step comprises the steps of selectively quantizing the amplitude of said incoming signal in accordance with a first preselected number of quantization levels until said prescribed frequency has been synchronously detected, and thereafter selectively quantizing the amplitude of said incoming signal in accordance with a second preselected number of quantization levels.

16. The improvement according to claim 15, wherein said second preselected number is larger than said first preselected number.

* * * * *